United States Patent [19]

Le Sergent et al.

[11] 4,121,919
[45] Oct. 24, 1978

[54] METHOD OF PRODUCING AN OPTICAL FIBRE BLANK

[75] Inventors: Christian Le Sergent, Marcoussis; Michel Liegois, Paris; Robert Pascal, Montlhery, all of France

[73] Assignee: Compagnie Generale d'Electricite, Paris, France

[21] Appl. No.: 876,371

[22] Filed: Feb. 9, 1978

[30] Foreign Application Priority Data

Feb. 18, 1977 [FR] France .................. 77 04820

[51] Int. Cl.$^2$ .................. C03C 25/02; C03B 37/00
[52] U.S. Cl. .................. 65/3 A; 65/2; 65/13; 65/DIG. 7
[58] Field of Search ......... 65/2, 3 A, 13, DIG. 7; 427/163

[56] References Cited

U.S. PATENT DOCUMENTS

| 3,961,926 | 6/1976 | Asam ............................. 65/3 A |
| 4,009,014 | 2/1977 | Black et al. .................... 65/3 A |
| 4,045,198 | 8/1977 | Rau et al. ...................... 65/3 A X |

OTHER PUBLICATIONS

Patent Associated Literature, Optical Fibers Based on . . . Glass, Gambling et al., Proceedings of IEE, vol. 123, No. 6, Jun. 1966, London, pp. 570–575.

*Primary Examiner*—Robert L. Lindsay, Jr.
*Attorney, Agent, or Firm*—Sughrue, Rothwell, Mion, Zinn and Macpeak

[57] ABSTRACT

The blank is made from a tube of silica with a layer of other glass coated on its inner surface. The said other glass is doped with $P_2O_5$ for example to increase its refractive index. The blank is then reduced in diameter from a tube to a rod by heating a region of the tube while it rotates in a glassmaker's lathe. The heated region is moved back and forth along the length of the tube until it is finally reduced to a rod. One effect of the moving heated zone is to evaporate some of the doping material, and the vapour tends to move along the tube ahead of the heated zone until it is eventually shifted out of the ends of the tube. To minimize this loss the back and the forth movement of the heated zone includes a sudden step forward at the end of each pass before returning in the opposite direction. This has the effect of jumping the heated zone ahead of the escaping doping material which is then pushed back along the bore of the tube for the next pass, with the jump-ahead-and-reverse operation being repeated at each reversing point of the back and forth heated pass to conserve as much of the doping material as possible inside the tube and finally within the resulting glass fibre blank.

3 Claims, 2 Drawing Figures

METHOD OF PRODUCING AN OPTICAL FIBRE BLANK

FIELD OF THE INVENTION

The present invention relates to methods of producing a blank of an optical fibre.

BACKGROUND OF THE INVENTION

One known method of producing a blank of an optical fibre consists firstly in vapour phase deposition of a layer of one type of glass including a doping material for increasing its refractive index on the inside cylindrical surface of a glass tube made of silica for example, then reducing the tube so as to remove its axial cavity and reduce its outside diameter. This reduction can be obtained by making the tube turn about its axis on a glass maker's lathe and by locally heating the rotating tube so as to soften it and by moving the heated zone along the tube progressively from one end of the tube to the other.

A rod is thus obtained whose diameter is less than the outside diameter of the original tube. This rod is constituted by a silica cladding and an axial core. The average refractive index of the core, which is formed by the deposited layer of glass, is higher than that of the cladding, which is itself formed by the silica of the tube. This rod is a blank which can be drawn in a furnace to obtain an optical fibre, as is well known.

Optical fibres obtained from such blanks have characteristics which can be insufficient for allowing the transmission of light signals at a high rate. For example, high dispersion of the transmitted signals may be observed: the duration of a very short signal injected at the input of such a fibre is much increased at the output.

The present invention aims to improve the method of producing a blank of an optical fibre set forth hereinabove, so as to improve the transmission characteristics of the optical fibres produced from this blank.

SUMMARY OF THE INVENTION

The present invention provides in a method of producing an optical fibre blank, successively:
depositing a layer of one type of glass on the interior surface of a cylindrical tube constituted by another type of glass, the glass of said layer including a doping material suitable for increasing the refractive index of said layer;
and reducing the tube by rotating it about its axis while heating an annualr zone of the rotating tube so as to soften it, and moving the heated zone progressively back and forth along the tube between its ends in successive strokes of opposite directions thereby reducing the tube to obtain said blank in the form of a rod whose diameter is smaller than the initial outside diameter of the tube, and wherein the axial cavity of the tube has disappeared. The movement of the heated zone comprises at least two strokes with a reversing operation between successive strokes being performed as follows:
the movement of the heated zone during the "old" stroke is stopped short of the end to which it was moving at a stopping point situated near the said end at a predetermined distance therefrom so that the last part of the tube beyond the stopping point is maintained during the "old" stroke at a temperature below the evaporation temperature of the doping material and the "new" stroke is begun from the said end and the last part of the tube becomes the first part for the "new" stroke and is heated and softened during the "new" stroke.

Further, the last stroke does not stop short at a stopping point but continues un-interrupted to the end of the tube.

BRIEF DESCRIPTION OF THE DRAWING

The invention is described hereinbelow by way of an illustration having no limiting character, with reference to the accompanying drawing, in which.

DESCRIPTION OF THE PREFERRED EMBODIMENT

Figure 1:
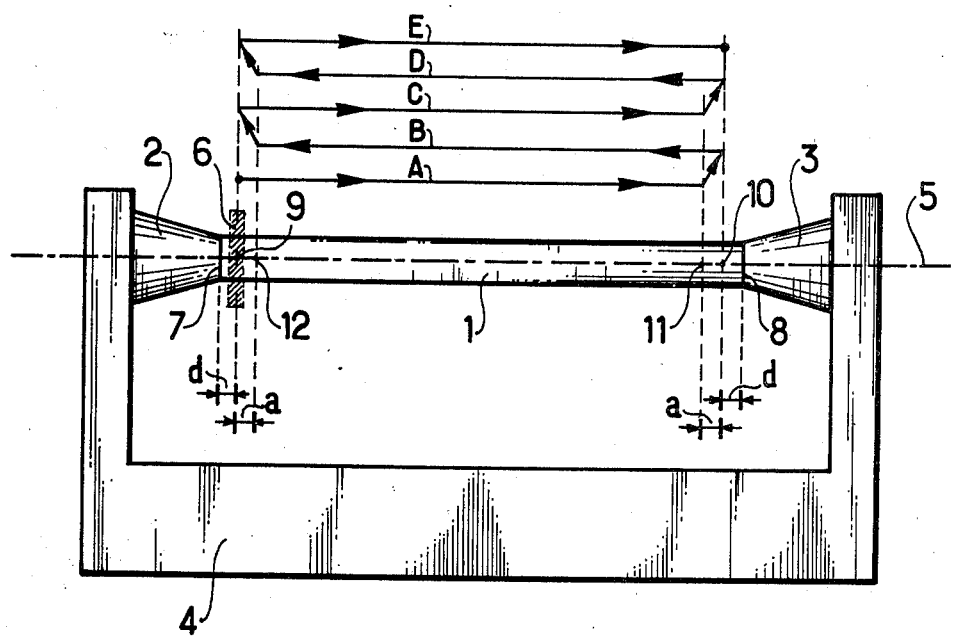
FIG. 1 shows schematically an embodiment of the method in accordance with the invention and FIG. 2 is a graph illustrating the optical characteristics of a prior art optical fibre blank.

Firstly, a layer of glass made for example of silica and phosphorus oxide $P_2O_5$ is deposited on the inner surface of a cylindrical silica tube. The layer of glass is deposited in the vapour phase, according to known methods. The phosphorus oxide $P_2O_5$ is a doping material which increases the refractive index of the glass layer, which index is higher than that of the silica constituting the original tube.

Thus, a tube is obtained which greatly resembles the original tube, since the layer deposited is very thin and transparent. This tube therefore has an axial cavity between its axis and the layer.

The reducing phase, which follows the depositing phase, aims at removing the axial cavity. To do this, the tube 1 (see FIG. 1) is installed by its ends 7 and 8 between the jaws 2 and 3 of a glass maker's lathe 4. The tube 1 is then made to rotate about its axis 5. During its rotation, an annular zone 6 of the tube 1 is heated, for example with a blow torch to a temperature sufficient to soften it. Under the effect of this heating the softened part comes closer to the axis of the tube, thereby achieving the desired reduction. The heating zone 6 is moved slowly along the tube, thereby reducing its outside diameter and progressively filling in its axial cavity.

The zone 6 is moved in at least two strokes; for example in five strokes. At the beginning of the first stroke, the heated zone 6 is situated at a point 9 of the axis of the tube at a very short distance $d$ from the end 7. Indeed, it is not possible to heat the tube up to its ends 7 and 8 to its softening point, since it is necessary for the jaws 2 and 3 of the lathe 4 to remain tightly clamped on the tube during the whole reducing operation. The distance $d$ is therefore determined by purely mechanical considerations which are completely irrelevant to the invention. Thus, two end points 9 and 10 of the tube, situated respectively at the distance $d$ from the ends 7 and 8 are defined and reduction must be effected only between these two end points 9 and 10.

During the first stroke the heating zone of the tube is moved slowly from the point 9 towards the point 10. In accordance with one characteristic of the invention, this movement is stopped at a point 11 situated at a predetermined distance ($a$) from the point 10 of the tube, the distance ($a$) being short in relation to the total length of the tube. By way of an example, this distance ($a$) can be of the order of 5 centimeters for a tube length of one meter. The movement of the heating means during the first stroke is shown in FIG. 1 by a line A traced parallel to the tube 1. When the tube is heated by means of a blow torch, the blow torch is moved away from the tube as soon as the heated zone reaches the point 11, in order to avoid heating the part of the tube lying between the points 11 and 10 during this first stroke. When the tube is heated by means of an electric device, the same result is obtained by reducing the heating power or by increasing the speed of movement of the electric device when the heated zone reaches the point 11. In all cases, it is necessary for the part of the tube lying between the point 11 and the point 10 to be maintained during this stage at a temperature lower than the evaporation temperature of the doping material ($P_2O_5$) contained in the glass deposited in the tube.

The second stroke of the movement of the heated zone starts from the end point 10 near which the first stroke ended. The movement is in the opposite direction of that of the first stroke towards the end point 10 and is stopped at a point 12 situated at the distance (a) from the point 9. This movement is indicated by the line B drawn in FIG. 1. The movement of the heated zone then undergoes a third stroke and a fourth stroke, indicated respectively by the lines C and D. The start of each stroke takes place at the end point of the tube near which the preceding stroke stopped.

The fifth and last stroke, indicated by the line E, starts from the point 9 of the tube and ends exceptionally at the point 10. During this stroke, the axial cavity of the tube 1 is finally removed.

The part of the tube situated between the end points 9 and 10 is by then transformed into a rod with a diameter which is smaller than the outside diameter of the original tube. After removal of the two non-reduced ends of the tube, a cylindrical blank is obtained which it is possible to draw in a furnace, in a known way, to obtain an optical fibre. The optical fibres drawn from blanks formed by the method described hereinabove have excellent transmission characteristics and in particular a low dispersion of the short duration signals.

It seems that this result can be explained by the following considerations:

In the prior art method, the heated zone is moved at each stroke from one end to the other of the tube. Since the tube is heated at a high temperature to soften the tube, the doping material contained in the layer of glass evaporates partially at the surface during this heating. It is known for example that phosphorus oxide $P_2O_5$ sublimes at a temperature of about 300° C., which is very much less than the softening temperature of silica (about 2000° C.). The vapour of doping material has a tendency to condense inside the tube, near the heated zone and preferably in the cold part of the internal cavity of the tube, situated downstream from the heated zone in relation to the direction of movement of the heating zone.

Figure 2:
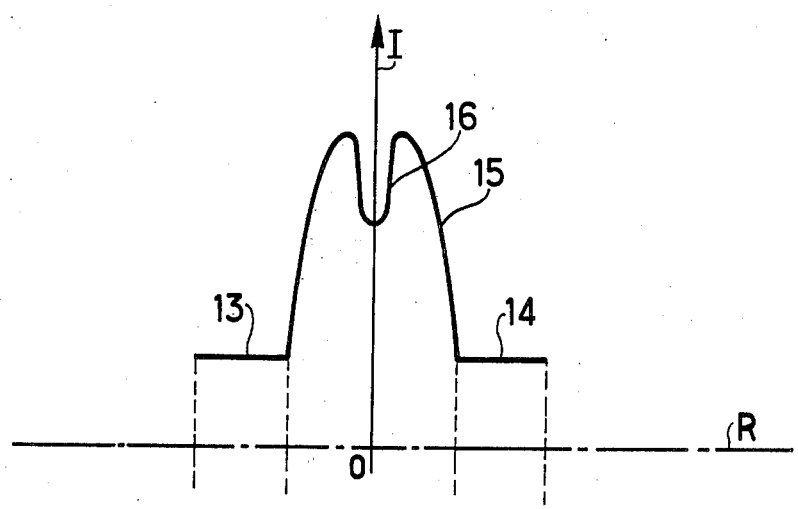

When the heated zone then reaches the part of the tube in which this condensation takes place, the condensed doping material evaporates again and so on. Therefore, everything happens as if an evaporated part of the doping material was pushed, during the movement of the heated zone, in the direction of this movement. In the prior art method, the movement of each stage ends at the end of the tube; the evaporated part of the doping material then escapes from the internal cavity of the tube. The result of this is a reduction of the refractive index in the axial zone of the blank thus obtained. FIG. 2 shows a curve representing the variation of the refractive index (I) of such blank as a function of distance (R) from the axis of the blank. This curve has two parts 13 and 14, with a constant index, which correspond to the index of the original tube, i.e. to the cladding of the blank and a part 15 with an increased index which has a substantially parabolic shape, which corresponds to the layer of glass deposited in the tube, i.e. in the core of the blank. This part 15 has an axial dip 16 which illustrates the phenomenon of reduction of the refractive index mentioned hereinabove.

In the method according to the invention, the movement of the heated zone during the non-terminal strokes is stopped at a predetermined distance (a) from the opposite end of the tube. This distance (a) corresponds substantially to the length counted on the axis of the tube, on which a part of the doping material evaporated under the action of the rise in temperature of the heated zone is condensed. Since the movement of the heated zone in each stage is stopped at the distance (a) from the end of the tube, the removal of a part of the doping material, which thus remains condensed in an end part of the tube is avoided. During the following stroke, this condensed part is again evaporated and pushed towards the opposite end. In principle, there are therefore no losses of doping material at the end of each stroke, except for the last stroke (since it is necessary then to fill in finally the axial cavity of the tube). The method according to the invention therefore makes it possible to reduce greatly and even in certain cases to remove the index dip 16 (FIG. 2) which is observed in blanks obtained by the method according to the prior art. The absence of this index dip improves the optical fibre transmission performance and in particular reduces the dispersion of short signals.

The method according to the present invention can be applied to the production of optical fibres intended for telecommunications.

What we claim is:

1. A method of producing an optical fibre blank, comprising successively:

depositing a layer of one type of glass on the interior surface of a cylindrical tube constituted by another type of glass, the glass of said layer including a doping material suitable for increasing the refractive index of said layer;

and reducing the tube by rotating it about its axis while heating an annular zone of the rotating tube so as to soften it, and moving the heated zone progressively back and forth along the tube between its ends in successive strokes of opposite directions, thereby reducing the tube to obtain said blank in the form of a rod whose diameter is smaller than the initial outside diameter of the tube to the extent that the axial cavity of the tube disappears; said movement of the heated zone comprising at least two strokes with a reversing operation between successive strokes, the improvement wherein said movement is performed as follows:

stopping the movement of the heated zone during the "old" stroke short of the end to which it was moving at a stopping point situated near said end at a predetermined distance therefrom so that the last part of the tube beyond the stopping point is maintained during the "old" stroke at a temperature below the evaporation temperature of the doping material and beginning the "new" stroke from said end with said last part of the tube becoming the first part for the "new" stroke and being heated and softened during the "new" stroke; and continuing the last stroke un-interrupted to the end of the tube and not stopping short at a stopping point.

2. A method according to claim 1 wherein the said predetermined distance of the or each stopping point from the end(s) of the tube is about 5% of the total length of the tube between its ends.

3. A method according to claim 1, wherein the said reversing operation is performed four times (two at each end of the tube) in between five successive strokes.

* * * * *